Figure 1:
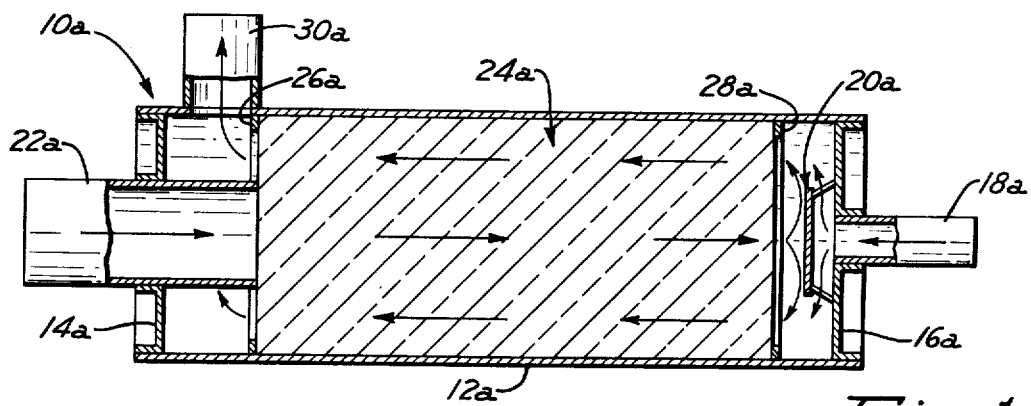

United States Patent [19]
Kobylinksi et al.

[11] 3,910,770
[45] Oct. 7, 1975

[54] CATALYTIC CONVERTER

[75] Inventors: Tadeusz P. Kobylinksi, Cheswick Township, Allegheny County; Brian W. Taylor, Richland Township, Allegheny County, both of Pa.

[73] Assignee: Gulf Research & Development Company, Pittsburgh, Pa.

[22] Filed: Dec. 23, 1971

[21] Appl. No.: 211,479

[52] U.S. Cl. .......... 23/288 FB; 55/DIG. 30; 60/299; 60/300; 60/301; 252/472; 252/477 R; 423/213.7
[51] Int. Cl.² .......................................... F01N 3/15
[58] Field of Search ...... 423/212, 213, 214; 60/299, 60/300, 301; 23/288 F, 277 C; 55/DIG. 30; 252/472, 477

[56] References Cited
UNITED STATES PATENTS

| | | | |
|---|---|---|---|
| 3,228,746 | 1/1966 | Howk et al. | 423/213 |
| 3,370,914 | 2/1968 | Gross et al. | 423/213 |
| 3,502,596 | 3/1970 | Sowards | 252/477 |
| 3,544,264 | 12/1970 | Hardison | 23/288 F X |
| 3,565,830 | 2/1971 | Keith et al. | 252/477 X |
| 3,597,165 | 8/1971 | Keith et al. | 252/477 X |
| 3,607,133 | 8/1971 | Hirao | 423/213 X |
| 3,637,344 | 1/1971 | Thompson | 423/214 |
| 3,701,823 | 10/1972 | Hardison | 423/204 |

*Primary Examiner*—James H. Tayman, Jr.

[57] ABSTRACT

A two-stage converter for both reducing nitrogen oxides and oxidizing CO and unburned hydrocarbons in internal combustion engine exhaust utilizing a monolithic corrugated ceramic catalyst carrier and ruthenium as the catalyst for at least the reduction reaction.

5 Claims, 4 Drawing Figures

CATALYTIC CONVERTER

This invention pertains to the removal of virtually all undesirable components from the exhaust gases of internal combustion engines. More specifically, the invention relates to an exhaust gas treating system or converter for use in automobiles particularly adapted to remove substantially all of the nitrogen oxides, carbon monoxide, and unburned hydrocarbons from such exhaust gases.

Ideally, automobile engines can be made to operate at stoichiometric air to fuel ratios for any particular speed. However, the automobile, especially in cities, is almost invariably operated at varying speeds so that CO, unburned hydrocarbons and nitrogen oxides are produced even by a perfectly adjusted automobile engine. The pollution produced is further increased in that very few engines are kept at perfect adjustment, and thus these pollutants can be produced in even greater quantities. Automotive choking caused by cold starting, improper timing and tuning, and generally dirty engines add further to the problem.

It is known that automotive pollution is due in the main to carbon monoxide, unburned hydrocarbons, and the nitrogen oxides. The water, carbon dioxide, nitrogen, hydrogen, and other trace components in automotive exhaust are either not polluting or of insufficient quantity to be a problem. Carbon monoxide is a poisonous gas and thus clearly harmful to humans. Any accumulation of raw hydrocarbons in the atmosphere is, of course, undesirable for a host of reasons. The nitrogen oxides are a much more subtle pollutant. These compounds, in the presence of sunlight, form ozone, and the ozone, in turn, reacts with the various organic pollutants to form other compounds which together constitute smog with its attendant visibility reduction, agricultural damage, and harm to humans, particularly eye irritation.

A great deal of effort in recent years has been expended in attempting to relieve the air pollution problem, specifically, the portion thereof caused by automotive exhaust. Virtually all of these proposed solutions are either of the mechanical or thermal or burning type; or else of the catalytic or chemical reaction type. These two approaches are very different from each other, and since the present invention is of the catalytic variety no further mention need be made of thermal converters or after burners.

Catalytic convertes may be either of the single bed or multiple bed variety. Recalling that it is desired to change the entire exhaust to $CO_2$, water and free nitrogen ($N_2$), and that the undesirable components are hydrocarbon compounds and CO on the one hand, and nitrogen oxides on the other hand, it can be seen that single bed systems inherently suffer from the disadvantage that they are either oxidizing to thereby convert the hydrocarbons and CO, or else reducing to thereby convert the nitrogen oxides. Thus, the present invention has advantages over most such prior devices which have only one active catalyst bed since such systems are unable to operate upon all of the different polluting components of automobile exhaust mentioned above.

The invention also has advantages over prior known dual or multiple bed systems. Some such converters comprise relatively complicated metal pipes, cans, and the like to achieve two separate beds. This relatively large number of metallic walls exposed to the exhaust gases increases the corrosion problem and the problems in packing the catalyst and its carrier into such multiple-walled devices, and thus shortens the life of such converters and increases their cost.

Another problem in all varieties of catalytic converters is the means to contact the catalyst with the exhaust gases, that is, the carrier for the catalyst. Such carriers have typically been individual particles such as beads formed of various refractory oxide materials, with the active catalytic materials coated onto such beads or particles. Such systems operate well when new, but are subject to the disadvantage that they rapidly deteriorate at an accelerating rate once even only a few of the carrier particles break down. The exhaust gases from automobiles engines pass through the exhaust system at tremendous rates of speed, on the order of a space velocity up to 200,000 GHSV, or even higher, and as soon as even a few particles break down and thus occupy a smaller volume, the high speed gases buffet the remaining particles about to thereby quickly render the contents of the converter nothing more than useless broken particles and powder. This same deterioration also results from normal attrition or wearing of such support beads or particles, and normal thermal shrinkage is perhaps the most important source of such deterioration since the temperature in a catalytic converter can go as high as 1800°F. Another problem with such particle type of carriers is that they tend to act as a flow restriction to the gases passing through the converter, with restriction produces additional problems.

These two problems, simplifying the physical converter construction, and preventing catalyst carrier deterioration are solved in the present invention by the use of a one-piece monolithic ceramic catalyst carrier of the general type known in the art as corrugated ceramics. Such materials are made by many companies, such as American Lava Corporation of Chattanooga, Tenn., a subsidiary of the 3M Company, their code identification number 70371, sold under the registered trademark "ThermaComb", and more fully described in U.S. Pat. No. 3,444,925, the disclosure of which patent is hereby incorporated by reference.

A second important aspect of the present invention is the particular catalyst used in combination with this carrier. The invention comprises both a reduction step to convert nitrogen oxides into molecular or free nitrogen and water, and an oxidation step to convert CO and unburned hydrocarbons into water and $CO_2$. The oxidation portion of exhaust gas handling may be considered the simpler problem in that the field is more highly developed, and therefore CO and hydrocarbons in the presence of excess oxygen are relatively easily changed into nonpollutants. The handling of the nitrogen oxides however has proven to be the more difficult problem. These problems and some of the solutions tried are described in the Paper: "$NO_x$ Reduction Catalysts for Vehicle Emission Control", by G. H. Meguerian and C. R. Lange, published by the Society of Automotive Engineers, Inc. and presented as a part of the Automotive Engineering Congress Meeting in Detroit, Mich. on Jan. 11–15, 1971. The problem is complicated by the fact that while several catalytic materials are available to convert nitrogen oxides (which are present in low concentrations in the exhaust gases from internal combustion engines) very rapidly to acceptable inert materials, such as free nitrogen, most of these catalysts are active only when pure reducing agents, such as carbon monoxide, are used in an anhydrous environment. Examples of these types of catalysts are the transition metal oxides, which are easily poisoned by trace amounts of water. It it obvious that these catalytic materials are unacceptable for use in an automobile exhaust muffler, since automobile exhaust gases can contain up to 16 per cent water.

Noble metals, such as platinum and palladium, retain their activity for the reduction of nitrogen oxides in the presence of water; however, hydrogen as a reducing agent using platinum or palladium as the reduction catalyst proved totally unacceptable, since hydrogen was found to react with the nitrogen oxides to produce substantial amounts of unwanted ammonia. The use of carbon monoxide as a reducing agent was also found undesirable, since it reacted with water over the platinum or palladium catalyst by the well-known water gas shift reaction to give hydrogen and $CO_2$. The hydrogen would then, in turn, react preferentially with the nitrogen oxides to give ammonia. Ammonia is not only a pollutant per se, but, additionally, the ammonia, if present would be reoxidized back to the undesirable nitrogen oxides in a secondstage oxidation reaction which would be normally employed to oxidize any unburned hydrocarbons or carbon monoxide in the exhaust gases to form $CO_2$ and water. As a consequence, the desired amount of nitrogen oxide removal could not be achieved. It was, of course, not possible to add the oxidizing gas at the first stage, since the platinum and palladium catalysts do not function to reduce NO in the presence of a predominating oxidizing atmosphere.

We have found that nitrogen oxides in exhaust gases from internal combustion engines can be selectively reduced to form nitrogen as substantially the only nitrogen-containing compound, without formation of significant amounts of ammonia, by a process which comprises passing said exhaust gas at elevated temperatures in a reducing atmosphere into contact with a catalyst bed containing from about 0.003 to about 0.5 Troy ounce of metallic ruthenium per 1000 cubic feet of exhaust gas per hour, measured at 0°C. and 14 psia, and preferably from about 0.008 to about 0.3 Troy ounce, but most preferably from about 0.01 to about 0.2 Troy ounce. By "Troy ounce" of ruthenium we mean 31.1 grams of ruthenium. When amounts of ruthenium are given herein in the specification and claims, such amounts are calculated on metallic ruthenium. The invention is operative with a catalyst consisting essentially of ruthenium, ruthenium alone, and also ruthenium in combination with other materials, for example, promoters, such as potassium, sodium, calcium, barium, magnesium, lithium, rubidium, cesium, strontium and thallium, metals, such as platinum, palladium, rhodium, cobalt, nickel, iron, manganese, rhenium, chromium, molybdenum, tellurium, tungsten, vanadium, mobium, antimony, tantulum, bismuth, titanium, zirconium, zinc, cadmium, copper and uranium, etc., provided the amount of ruthenium is within the critical limits defined herein.

Thus, another important aspect of the present invention is the use of ruthenium in the manner indicated above. The above-identified related patent applications set forth teachings in greater detail as the manner in which the ruthenium is used, and various test results which prove its effectiveness. Said related applications, for purposes of the present invention, teach the deposition of the ruthenium or ruthenium containing catalyst on the support of the invention by any suitable well-known manner, such as, for example, by contacting the support with an aqueous solution of ruthenium chloride. The catalyst can then be dried and calcined in the usual manner, for example, dried for six hours at 200°F. and then calcined for 12 hours at a temperature of about 700°F. to about 1000°F. Alternatively, the catalyst can be dried and reduced in hydrogen at an elevated temperature, in the well-known manner. As to operating temperature, generally, we have found that ruthenium works well at typical converter temperatures.

Insofar as support of the claims requires, it is deemed sufficient that one skilled in the art is instructed to use the amounts of metallic ruthenium mentioned above. Our test work has shown that satisfactory results for automotive converter use has been found to occur in a temperature range of about 400°F. to about 1500°, or even higher, and that such range easily encompasses the entire range of temperature of internal combustion engine exhaust gases normally encountered.

As mentioned above, the converter or exhaust gas treatment system of the invention performs a two-stage process, namely, first, reduction of nitrogen oxides, and then oxidation of CO and unburned hydrocarbons. As is known, and as is mentioned above, there are many substances useful as the catalyst for the oxidation reaction. We have also found that ruthenium also operates well as an oxidation catalyst. Thus, as will be described in detail below, the ruthenium can be used in combination with the carrier of the invention to further simplify fabrication of converters in accordance with the invention. The opposing considerations in this regard are that the use of ruthenium in both beds can simplify manufacturing, but, ruthenium is considerably more expensive than many of the other substances which could be used as the oxidation catalyst only.

In regard to the oxidation reaction, an important consideration is that there be a substantial absence of ammonia. Ammonia, if present in an oxidizing environment, would itsel quickly reoxidize to form undesirable nitrogen oxides. Thus, by the use of the ruthenium catalyst as taught by the invention in the first reduction step, an interim ammonia-free product or partially treated exhaust is produced, whereby such gases can then be oxidized to render any unburned hydrocarbons and carbon monoxide into non-polluting substances. The oxidation can be performed either with well-known oxidation catalysts or with the ruthenium catalyst of the invention. Excess air for the oxidation reaction is supplied under pressure into the treated nitrogen oxide free gases at a flow rate such that a complete oxidation will take place and the average temperature of the whole monolithic catalyst bed is maintained in a range of about 400°F. to about 1700°F., and preferably at a temperature in a range of about 900°F. to about 1400°F.

As to conventional oxidation catalysts, any of the metals of Group VIII such as platinum or palladium could be used, as well as more ordinary metals such as copper, vanadium or chromium, or combinations of such metals. Other oxidation catalysts, oxidation conditions, and operational procedures can be obtained from the prior art, such as U.S. Pat. No. 3,503,715 to Haensel.

This invention provides a method of treating the exhaust gases from an internal combustion engine comprising the steps of providing a first catalyst on a first portion of a monolithic corrugated ceramic catalyst carrier, passing the raw exhaust gases into contact with said first catalyst on said first portion to selectively convert the nitrogen oxides in said exahust gases to molecular nitrogen, adding air under pressure to the partially treated exhaust gases after said gases have contacted said first catalyst providing a second catalyst on a second portion of said monolithic corrugated ceramic catalyst carrier, and passing the mixture of said additional air and said partially treated exhaust gases into contact with said second catalyst on said second portion to convert the CO and unburned hydrocarbons in said exhaust gases to $CO_2$ and water.

It is preferred to produce a temperature inside the catalyst bed in the reduction reaction zone in the ranges mentioned above. In the environment of internal combustion engines these temperatures can be controlled in various manners, such as by controlling the distance between the converter and the exhaust manifold, by positioning the converter more or less into the slipstream around the vehicle, and/or by providing additional heating by suitable passage of the raw or treated exhaust gases first around the outside of the converter. Similarly, the converter could be cooled by directing pressurized ambient air around the converter.

An additional requirement is the maintenance of an effective reducing atmosphere in the nitrogen oxide reducing reaction portion of the monolithic catalyst carrier of the invention. By "reducing atmosphere" we mean an atmosphere wherein the stoichiometric ratio of molecular oxygen to reducing agents present is less than 1:1, preferably about 0.9:1, or less. By "stoichiometric ratio of molecular oxygen to the reducing agents" we mean the amount of oxygen stoichiometrically required to convert the reducing agent or agents to their higher oxidation states. By "reducing agent" we mean to include substances which can be oxidized by molecular oxygen, for example, substances such as hydrogen, hydrocarbons and carbon monoxide which can be converted to water and carbon dioxide, respectively.

Figure 2:
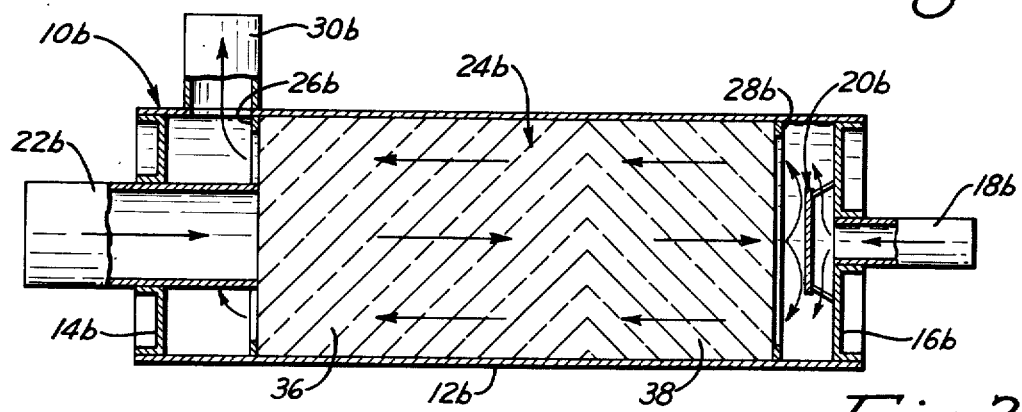
Figure 3:
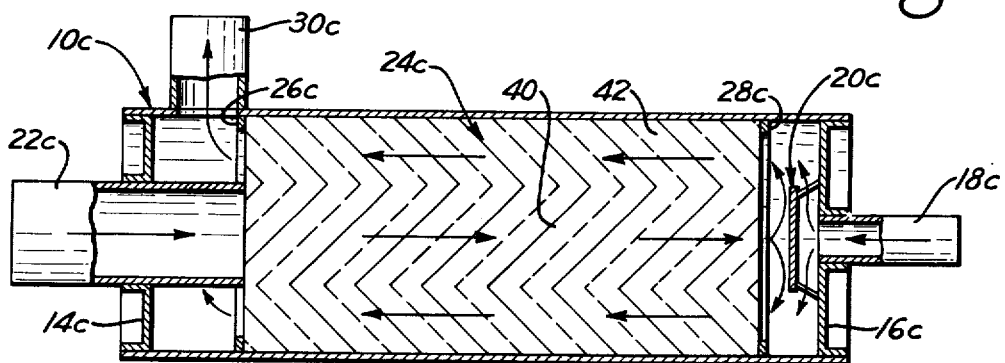
Figure 4:
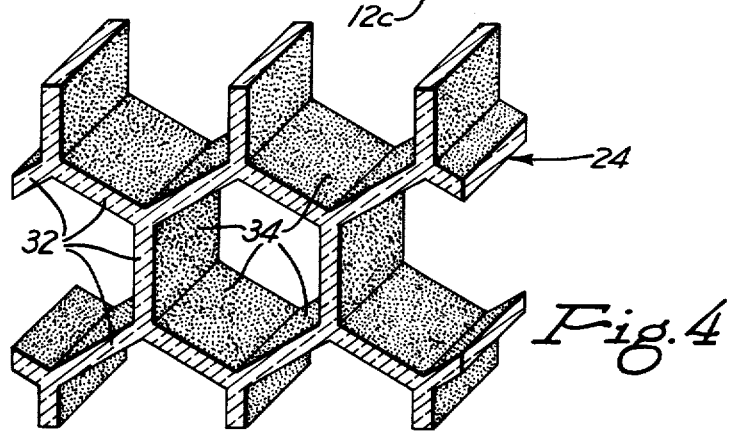

The above and other advantages of the invention will be pointed out or will become evident in the following detailed description and claims, and in the accompanying drawing also forming a part of the disclosure, in which:

FIGS. 1, 2 and 3 are three similar longitudinal cross-sectional views of three different embodiments of a single two-stage converter embodying the invention, and FIG. 4 is an enlarged detail of the catalyst carrier of the invention.

Referring now in detail to the drawing, and particularly to FIGS. 1, 2 and 3, there is shown three embodiments 10a, 10b and 10c of converters embodying the invention. Most of the parts in the three figures are the same and accordingly will be indicated by the same reference numeral followed by the appropriate letter a, b, or c, respectively. Each converter comprises a main body portion 12 which may be of generally cylindrical configuration. At one end, body 12 is provided with an exhaust end plate 14 and at the opposite end there is provided an air intake end plate 16. A conduit 18 is fitted in a suitably formed opening in plate 16 and carries air under pressure from supplemental air supply means, not shown, to the converter 10. It is known that some sort of pressurizing means, a pump, or the like will almost certainly have to be added to automotive engines to supply the excess air required by converters such as the converters 10 of the invention which will be used to solve the pollution problem. End plate 16 carries deflection means 20 to spread the air from conduit 18, which deflection means may comprise simply a plate mounted on suitable spokes.

The exhaust carrying conduit 22 from the engine passes through a suitably formed opening in end plate 14 and terminates in physical contact with one end of the body 24 of the catalyst carrier within the main body 12. The space within main body 12 which is occupied by catalyst carrier 24 is defined by a pair of rings 26 and 28 snugly fitted within body 12 in spaced relation to the end plates 14 and 16 respectively. Thus, a chamber is formed between the ring and end plate at each end of the converter. A conduit 30 communicates with the chamber so formed between ring 26 and end plate 14.

All the parts described thus far, with the exception of the catalyst carrier 24, may be made of metal using conventional muffler and converter fabrication techniques, including sheet metal stamping and bending, edge joining by folding and crimping or bead welding or spot welding, and fitting of parts together by press fitting, spot welding and the like. While the drawings show a two-stage catalytic reaction process performed in a single bed in a single converter, it should be understood that the invention system is not so limited, and other forms could be used. For example, the exhaust could go through two separate beds each mounted in a separate converter body with the two bodies arranged in tandem. As another example, other forms of the corrugated ceramic catalyst carrier could be used, such as, for example, a square block of ceramic with the passages arranged at right angles to each other in alternate layers. In such a case, in order to provide a more compact converter, the body or casing would comprise means to direct the flow of treated exhaust gas between the reduction and oxidation zones around a 90° turn. For an illustration of this concept, see FIGS. 1 and 5 of U.S. Pat. No. 3,295,919 to Henderson et. al. Thus, the invention should not be deemed limited to these constructional details since the teachings of the invention can be embodied in many forms which will present themselves to those skilled in the muffler and converter manufacturing arts.

Referring now to FIG. 4, there is shown an enlarged broken out detail of a typical section of any one of the catalyst carriers 24a, 24b or 24c. References are given above to publically available information describing these carriers, and thus they need not be described in any further detail here. For purposes of this disclosure it is deemed sufficient that the carrier comprises a plurality of ceramic walls 32 which together form separate elongated passages. These passages extend from end to end, horizontally left to right, in the embodiments of FIGS. 1, 2 and 3, as indicated by the arrows on the drawing, and into the paper in FIG. 4 as is indicated by the perspective. The catalyst, as defined herein, is coated onto these walls 32 as indicated by the stippling 34.

The catalyst deposition on the walls 32 of the carrier 24 will be such as to not present any flow restriction. However, because the carrier of the invention presents a very large number of very small separate passageways thus providing a relatively large amount of surface area, a relatively large quantity of catalyst can be used to thus treat the exhaust in a relatively small space.

The experimental work done to date in testing the invention has been on a prototype basis using synthesized exhaust gases and scale model simulated converters. No full-size tests on vehicles have yet been performed. In the test work, a product known as AlSiMag 795, which is a porous Cordierite material supplied by American Lava, as mentioned above, was used. Various cylindrical samples about 3 inches long and 1 to 2½ inches in diameter were used. American Lava sets the sizes of its corrugated ceramic material in terms of nominal corrugations per inch, and testing was carried on with the sizes of 5, 8 and 12 corrugations or, more accurately, hexagonal cells, per inch. In scaling up to full size devices, it is thought that different such materials would be used dependent upon the particular engine. That is, for example, a tractor trailer having an enormous engine would certainly need a different converter than an economy car with a tiny four-cylinder engine. In all cases, the general considerations in selecting a particular corrugated ceramic carrier for a particular exhaust treatment system or converter include, first, the need for strength. Converters suffer abuse in use in vehicles and thus must be strong enough or else protected to withstand the treatment. The ceramic also must be strong enough to survive being fabricated into a converter; that is, if the coated ceramic carrier is to be loaded into a prepared metal "can", then it must withstand the pressure used to urge it into that converter housing with a tight fit. This, incidentally, was the system used in testing the invention.

Another consideration working in opposition to the need for strength is the need to have thin walls so that the catalyst carrier will conduct heat throughout itself rapidly so as to come to operating temperature rapidly.

Another consideration which dictates small passageways is the desire to have a large amount of surface area for catalyst deposition in a small, total volume-wise, catalyst carrier. It is desirable that the converter be as small as possible for various well-known reasons and yet large enough to carry sufficient catalyst for the harshest operating conditions. A final consideration dictating the opposite, large openings, is the need that passageways in the carrier not act as a substantial flow restrictor to the exhaust gases since such flow restriction, of course, would have a detrimental effect on the power produced by the engine. Still another consideration regarding the size of the individual passageways is that they be small enough with regard to their length that all the gas in the passageway contacts the catalyst.

These and other considerations will manifest themselves to those skilled in the art and are familiar to such persons and can be readily balanced by them to produce operative converters in accordance with the invention for any particular internal combustion engine.

For the reasons developed above, it is desired that the reduction of nitrogen oxides occur first and that it take place without any excess air present. Thus, in all three embodiments 10a, 10b and 10c, the raw exhaust in conduit 22 first passes through the center part of the catalyst carrying bed 24 where the ruthenium catalyst of the invention is provided. As can be easily imagined from FIG. 4, the bed 24 comprises a very large number of very small passageways, and since the raw exhaust conduit 22 is tight up against the left hand face of the carrier bed there is effectually a continuation of this conduit through the bed but solely in the region exposed to the open end face of the conduit 22.

In FIG. 1, there is shown a relatively simple embodiment wherein the entire catalyst bed 24 is coated with a ruthenium catalyst. The raw exhaust first passes from left to right through the center of the bed and the nitrogen oxides in the exhaust are converted to molecular nitrogen and other unobjectionable substances. This first reduction reaction occurs without the creation of ammonia, or at least without the production of any more ammonia than can be tolerated. The thus treated exhaust then impinges upon deflection means 20a and is mixed with the excess air in the space between ring 28a and end plate 16a, and then proceeds through the outside portion of the catalyst bed 24, at which time the ruthenium catalyst thereon oxidizes the remaining pollutants with the excess air to $CO_2$ and water. The pollutant free exhaust is then released into the atmosphere via conduit 30a. An advantage of the three embodiments shown, i.e., nested beds, is that the oxidation reaction which is performed in the outside of the nested bed is strongly exothermic, and that heat is beneficially employed by conduction through the walls 32 to heat the inside of the composite catalyst carrier during start up since the reduction reaction is only slightly exothermic.

Referring now to FIG. 2, there is shown a catalyst bed 24b which has a portion 36 of the raw exhaust side coated with the ruthenium catalyst of the invention, and the remaining portion 38 coated with any other suitable oxidation catalyst. Such a dual catalyst bed can be produced by effectually "dipping" each end of a single ceramic carrier in two different catalysts. Such structure would be desired to minimize the amount of ruthenium used. Examples of other less expensive more common substances useful as the oxidation catalyst and copper, vanadium or chromium containing catalysts. In this FIG. 2 embodiment the raw exhaust is treated for nitrogen oxides only in that portion of the bed 28 defined by the diameter of pipe 22b between the ring 26b and the imaginary line between the portions 36 and 38. In all other portions only oxidation can occur. The size of the parts, conduit 22 and portions 36 and 38, may be adjusted accordingly.

The embodiment 10c of FIG. 3 is another dual catalyst arrangement on a similar carrier with the center portion 40 carrying the ruthenium catalyst of the invention and the outer annular portion 42 carrying some suitable known oxidation catalyst. This form, like FIG. 2, would be used to minimize the amount of ruthenium used, but requires somewhat more involved dipping procedures including masking of each part when dipping the other part.

While the invention has been described in detail above, it is to be understood that this detailed description is by way of example only, and the protection granted is to be limited only within the spirit of the invention and the scope of the following claims.

We claim:

1. A two-stage catalytic converter for treating internal combustion engine exhaust gases comprising a converter body, a single monolithic corrugated ceramic catalyst carrier formed with a relatively large number of relatively small individual passages extending longitudinally therethrough, means to mount said carrier with said body to substantially fill the space within said body, a reduction catalyst coated onto the walls of a first portion of said passages in said carrier to thereby define a reduction catalyst bed in said carrier, an oxidation catalyst coated on the walls of a second portion of said passages in said carrier to thereby define an oxidation catalyst bed in said carrier, said first and second portions of said passages being so located that said reduction bed is nested within said oxidation bed, means to admit exhaust gases to be treated into said converter body at a first location therein and into the ends of the passages of said reduction bed in said carrier associated with said first location; and means to admit air under pressure into said converter body at a second location therein, and to mix said air under pressure with said exhaust gases after said exhaust gases have exited from the passages of said reduction bed at said second location, and to admit the mixture of said air and the partially treated exhaust gases into the ends of the passages of said oxidation bed in said carrier associated with said second location.

2. The combination of claim 1, wherein said first portion is concentrically located within said second portion and said monolithic catalyst carrier is of generally cylindrical shape.

3. The combination of claim 1, wherein all of said passages in said carrier are of hexagonal cross-sectional shape.

4. A two-stage internal combustion engine exhaust treating system comprising an elongated cylindrical body, a single monolithic corrugated ceramic catalyst carrier formed with a relatively large number of relatively small individual passages extending longitudinally from end to end through said carrier, means to mount said carrier in said converter body in spaced relation to the ends of said converter body to substantially fill said converter body, a reduction catalyst coated onto the walls of a central portion of said passages in said carrier to thereby define a central reduction catalyst bed in said carrier, an oxidation catalyst coated onto the walls of an annular portion of said passages in said carrier surrounding said central portion to thereby define an annular oxidation catalyst bed in said carrier, means to admit exhaust gases to said central reduction bed from one end of said body to the corresponding one end of said carrier, means to add air under pressure to the partially treated exhaust gases after they have exited from said central reduction bed at the opposite end of said carrier and at the corresponding opposite end of said body, and means to pass the mixture of said partially treated gases and said pressurized air to said annular oxidation catalyst bed at said opposite end of said carrier.

5. The combination of claim 4, wherein all of said passages in said carrier are of hexagonal cross-sectional shape.

* * * * *

UNITED STATES PATENT OFFICE
CERTIFICATE OF CORRECTION

PATENT NO. : 3,910,770
DATED : October 7, 1975
INVENTOR(S) : Tadeusz P. Kobylinski and Brian W. Taylor It is certified that error appears in the above-identified patent and that said Letters Patent are hereby corrected as shown below:

Col. 1, line 19, "and thus these pollutants" should read ---and thus these three pollutants---.

Col. 2, line 30, "with restriction" should read ---which restriction---.

Col. 3, line 63, "as the manner in" should read ---as to the manner in---.

Col. 8, line 28, "36 of the raw exhaust" should read ---36 on the raw exhaust---.

Col. 8, line 32, "be produced" should read ---be readily produced---.

Col. 8, line 36, "oxidation catalyst and " should read ---oxidation catalyst are---.

Col. 8, lines 66 & 67, "said carrier with said body" should read ---said carrier within said body---.

1st page, under References Cited, very last one under Hardison, "423/204" should read ---423/214---.

Signed and Sealed this ninth Day of March 1976

[SEAL]

Attest:

RUTH C. MASON
*Attesting Officer*

C. MARSHALL DANN
*Commissioner of Patents and Trademarks*